(12) United States Patent
Vincenti et al.

(10) Patent No.: US 10,322,911 B2
(45) Date of Patent: Jun. 18, 2019

(54) RIGGING BASKET

(71) Applicant: Killswitch, Inc., Burbank, CA (US)

(72) Inventors: Nicholas Vincenti, Los Angeles, CA (US); Christopher Ryan Doshay, Bellflower, CA (US)

(73) Assignee: Killswitch, Inc., Burbank, CA (US)

( * ) Notice: Subject to any disclaimer, the term of this patent is extended or adjusted under 35 U.S.C. 154(b) by 12 days.

(21) Appl. No.: 15/685,883

(22) Filed: Aug. 24, 2017

(65) Prior Publication Data

US 2019/0062123 A1 Feb. 28, 2019

(51) Int. Cl.
*B66C 1/12* (2006.01)
*B66D 3/12* (2006.01)
*F16G 11/14* (2006.01)

(52) U.S. Cl.
CPC .................. *B66C 1/12* (2013.01); *B66D 3/12* (2013.01); *B66D 2700/026* (2013.01); *F16G 11/14* (2013.01)

(58) Field of Classification Search
CPC ... A44C 5/0053; A44C 5/0061; A44C 5/2033; A44C 5/2038; A44C 5/2019; B66C 1/12; B66C 1/14; B66D 3/12; B66D 2700/026; B66D 3/04; F16G 11/14; F16G 11/143; F16G 11/146; F16G 11/00; F16G 13/12; F16G 15/00; F16G 15/04; A45F 2005/006; A45F 5/00; A45F 2003/001; A63B 69/201; A63B 2209/10; A63B 2225/09; A45C 13/001; B66F 19/00; B66F 9/02; A63G 9/12; Y10T 24/31; Y10T 24/312

USPC ........ 24/298; 294/82, 85, 82.11, 74; 212/76, 212/95; 248/60, 214, 340, 341, 342, 328, 248/343, 344, 339, 317; 224/493, 514, 224/184; 254/262, 409; 292/307 R; 472/118; 59/93
See application file for complete search history.

(56) References Cited

U.S. PATENT DOCUMENTS

| | | | | |
|---|---|---|---|---|
| 1,063,738 A | * | 6/1913 | Ruland | B66C 1/18 294/74 |
| 1,177,856 A | * | 4/1916 | Gaydeski | B66C 1/18 294/74 |
| 3,170,206 A | * | 2/1965 | Triplett | B42D 17/00 24/116 R |
| 5,425,485 A | * | 6/1995 | Carlo | A45F 3/14 224/250 |
| 8,126,184 B2 | | 2/2012 | Parker | |

(Continued)

*Primary Examiner* — Jack W Lavinder
(74) *Attorney, Agent, or Firm* — Innovation Capital Law Group, LLP; Vic Lin

(57) ABSTRACT

A rigging assembly has no loose parts that an up-rigger may drop. The rigging assembly includes a length of steel cable terminating in a loop at each end. One loop extends through an oblong master link, while the other loop extends through a swivel hook. The ground-rigger can attach the hook of a hoist's chain to the master link on the ground. The ground-rigger can then tie the up-rigger's rope onto the master link. The up-rigger then pulls the rigging assembly and the hoist's chain up to the beam, leaving the master link and chain under the beam. Then the up-rigger grabs the hook end of the rigging basket assembly, bends it over the beam, and attaches the swivel hook end to the master link, thus creating a loop around the beam to support the hoist's chain and load, which is known in the industry as creating a basket.

9 Claims, 2 Drawing Sheets

(56) References Cited

U.S. PATENT DOCUMENTS

2013/0047410 A1    2/2013   Campbell et al.
2015/0260259 A1    9/2015   Kuivamäki \* cited by examiner

RIGGING BASKET

BACKGROUND OF THE INVENTION

1. Field of the Invention

One or more embodiments of the invention relates generally to rigging accessories. More particularly, the invention relates to a rigging basket lacking any loose parts that may fall during rigging of a basket on a structural beam for a chain hoist attachment.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Rigging is often required for performances such as concerts and theater performances, as well as for other gatherings where sound, lighting or other items need to be suspended from structural beams above a performance floor.

Rigging is a very dangerous field, requiring up-riggers to work at heights of 20-200 feet suspended above the ground. While in the air, they must screw and unscrew shackles, often above their coworkers below. A conventional basket is made up from a piece of steel, 2 shackles, and a piece of burlap to protect the steel. That amounts to five loose parts the ground rigger has to assemble, and two loose parts a rigger has to unscrew and screw in mid-air. If a rigger drops the shackle or pin of the shackle, and it hits someone below, it can cause serious injury or death.

To create a rigging basket using conventional apparatus, the up-rigger has to hold the load of the chain in the air, and use both hands to loosen the pin of the shackle, swing the cable over the beam (while holding a loose shackle and pin in their hand,) grab the end of the cable and make the basket by re-assembling the loose shackle. Riggers have the potential to drop the pin or the shackle on the ground rigger below, or any other person working the job.

The problem of potentially dropped items has been solved in the past with extensive employee training and by hiring experienced riggers, because experienced workers are less likely to drop things. However, nothing has eliminated human error. Another prior solution to dealing with the loose parts that could potentially seriously injure someone was to tie each individual part off. This, however, is excessively time and labor intensive. There are fifty rigging companies in the USA alone, and they have resorted to making rigging baskets by hand with loose parts. These companies own tens of thousands of parts to make conventional baskets, but so far, no one has thought to eliminate the extra parts as a solution. The rigger's mantra might be "don't drop anything" but unfortunately it still happens.

In view of the foregoing, there is a need for an assembly that permits an up-rigger to create a rigging basket on a structural beam without the need to handle loose parts.

SUMMARY OF THE INVENTION

Embodiments of the present invention provide a rigging assembly comprising a cable; a first loop formed on a first end of the cable; a second loop formed on a second end of the cable; a master link extending through the first loop; and a swivel hook extending through the second loop, the hook configured to removably attach to the master link.

Embodiments of the present invention further provide a rigging assembly comprising a cable; a first loop formed on a first end of the cable by extending the first end about a first eye; a second loop formed on a second end of the cable by extending the second end about a second eye; a cable covering disposed over the cable between the first and second loops; an oblong-shaped master link extending through the first loop; and a self-locking swivel hook extending through the second loop, the hook configured to removably attach to the master link.

Embodiments of the present invention also provide a method for creating a basket comprising attaching a hoist's chain to a master link of a rigging assembly, the rigging assembly including a cable, a first loop formed on a first end of the cable, a second loop formed on a second end of the cable, the master link extending through the first loop, and a hook extending through the second loop; lifting the rigging assembly and attached hoist's chain to a beam; wrapping the hook of the rigging around the beam; and attaching the hook to the master link.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
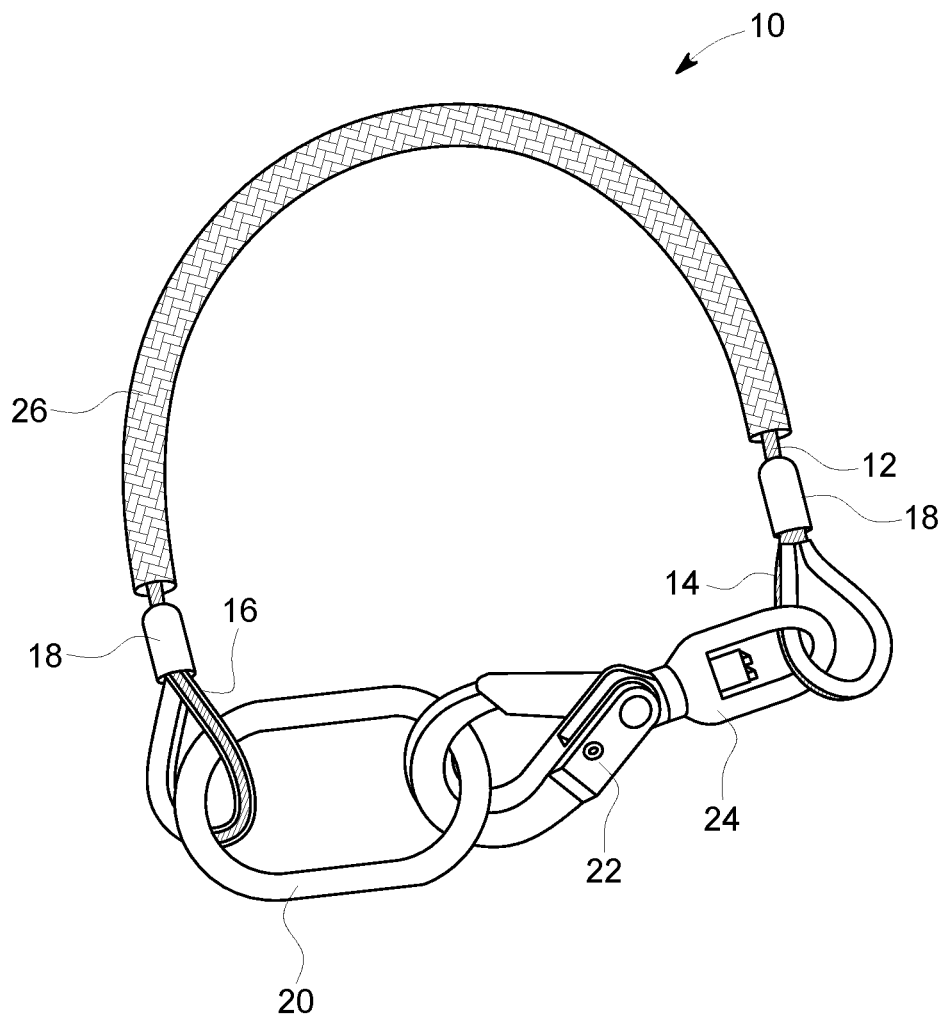
FIG. 1 is a perspective view of a rigging basket assembly according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

As is well known to those skilled in the art, many careful considerations and compromises typically must be made when designing for the optimal configuration of a commercial implementation of any assembly, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a rigging assembly to create a basket that has no loose parts that an up-rigger may drop from their elevated working position. The rigging assembly includes a length of steel cable terminating in a loop at each end. One loop extends through an oblong master link, while the other loop extends through a swivel hook. The ground-rigger can attach the hook of a chain hoist to the oblong master link on the ground. The ground-rigger can then tie the up-rigger's rope onto the top of the master link. The up-rigger then pulls the rigging basket assembly and the hoists' chain up to the beam, leaving the master link and chain under the beam. Then the up-rigger grabs the hook end of the rigging basket assembly, bends it over the beam, and attaches the hook end to the master link, thus creating a loop around the beam to support the hoists' chain and load, which is known in the industry as creating a basket.

The rigging basket assembly of the present invention has multiple purposes. For example, it eliminates all loose hardware overhead, helping to reduce the risk of a rigger dropping loose hardware while making the connections. The rigging basket assembly has a master link, also referred to as an oval link or oblong link, built in to receive a dead hang if desired. Often shows that go into production for weeks remove the motors from the rigging above and transfer the rigging to a "steel dead hang". This would require an oval link to be added to a conventional basket. With the basket assembled according to the present invention, the oval link is built in.

The rigging basket assembly can be made in various sizes. For example, a three-foot cable can be used for low trim height rooms, or for attaching to I-beams and "perms" in studios. A five-foot cable can be used as a generic basket size for all applications. A ten-foot cable can be used for larger applications. Moreover, multiple ones of the basket assemblies of the present invention may be linked together, depending on the specific application. Of course, other sizes are contemplated within the scope of the present invention.

The rigging basket assembly of the present invention can create a basket in about one-tenth the time as a conventional basket, thus saving time and money for the client.

Referring to FIG. 1, a rigging basket assembly 10, also referred to as a basket 10, can be formed from a cable 12 having loops 14 formed on each end thereof. The loops 14 can be formed in various manners as may be known in the art. For example, the loops 14 may be formed by wrapping each end of the cable 12 around a Flemish eye 16 and securing the end of the cable 12 back onto itself with a thimble 18.

A master link 20 may extend through one of the loops 14. The master link 20 may be formed in an oval or oblong shape as shown in the Figures. Of course, other shapes may be used, depending on the particular application. However, by using an oval or oblong link, the basket can be used, as-is, for a dead hang. In some embodiments, a one-half inch, 2.9 ton oblong master link may be used.

A hook 22 can be extended through the other one of the loops 14. In some embodiments, the hook 22 can be a self-locking hook, allowing the up-rigger to easily connect the hook onto the master link 20, as described below. In some embodiments, the hook 22 can be a swivel hook, having a swivel end 24 that extends through the loop 14 to permit the hook to swivel. The hook 22 may be, for example, a grade 100, swivel, self-locking 2.5 ton hook.

Because the loops 14 are formed in the cable 12 as a permanent loop, the master link 20 and the hook 22 are permanently attached through the loops 14 and, therefore, are integral components of the rigging basket assembly 10. In other words, the rigging basket assembly 10 may be described as a one-piece assembly, meaning there are no loose parts.

The cable 12 may be a steel cable as is known in the art. For example, the cable 12 may be a $3/8"\times 6/19$ independent wire rope core (IWRC) extra-improved plowed steel (EIPS) wire rope, or $7/19$ galvanized aircraft cable. Of course, other cables having sufficient strength for the particular application, may be used in the rigging assembly 10 of the present invention.

In some embodiments, the cable 12 may be covered by a cable covering 26. In some embodiments, the cable covering 26 may be a $5/8"$ color coded translucent reinforced PVC hose. The translucency of the cable covering 26 may provide easy visual inspection of the cable 12. The color coding can use, for example, translucent blue to signify a three-foot cable, translucent red to signify a five-foot cable and clear to signify a ten-foot cable. Of course, other color coding may be employed depending on user preferences and the particular application.

Figure 2:
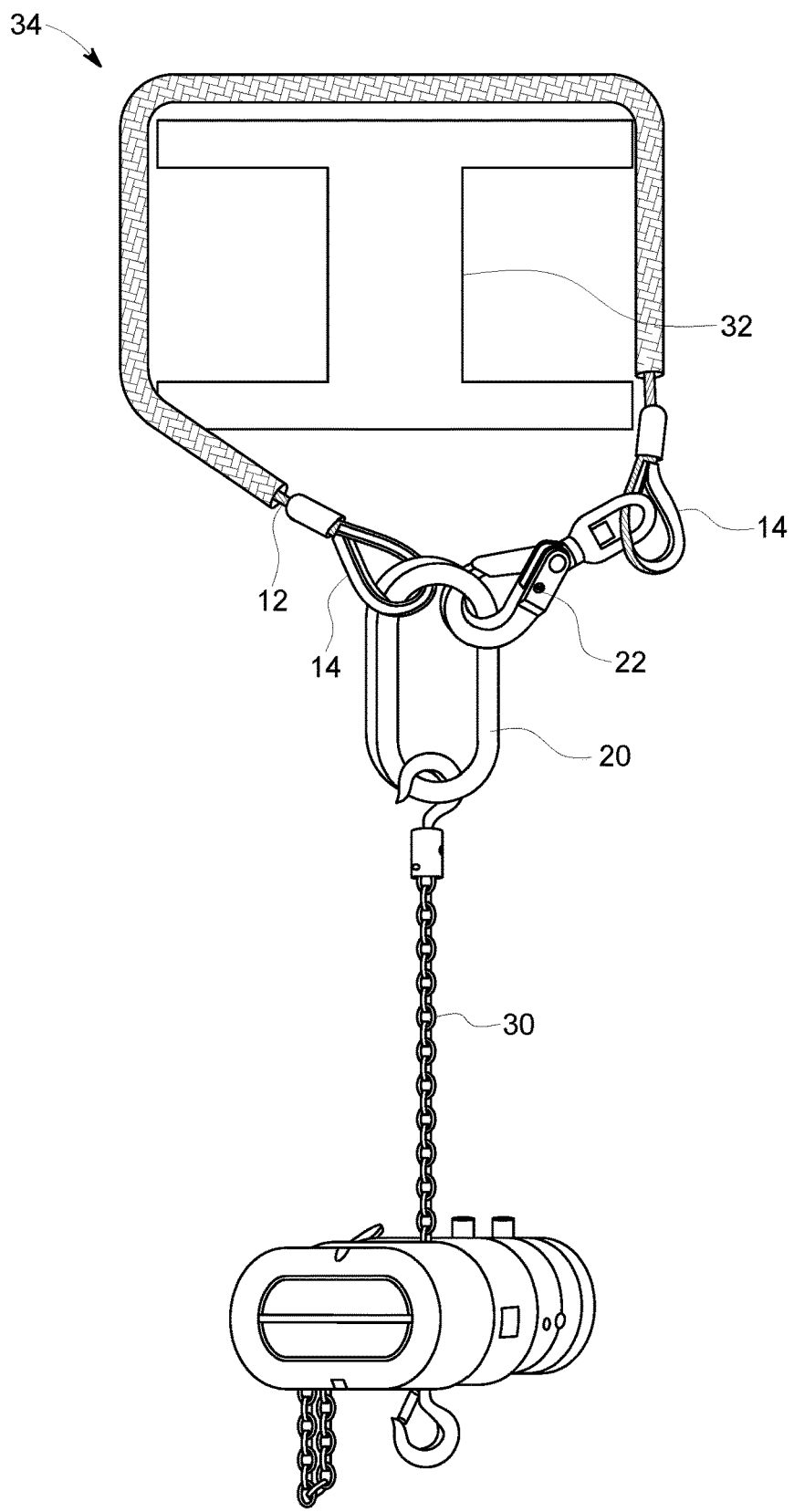
FIG. 2 is a cross-sectional view of a structure element having the rigging basket assembly of FIG. 1 assembled thereabout.

Referring now to FIGS. 1 and 2, a basket 34 can be formed by the method described below. First, the ground-rigger can attach the hook of a hoist's chain 30 to the oblong master link 20 on the ground. The ground-rigger can then tie the up-rigger's rope (not shown) onto the top of the master link 20. The up-rigger then pulls the rigging basket assembly 10 and the hoists' chain 30 up to the beam 32, leaving the master link 20 and chain 30 under the beam 32. Then, the up-rigger grabs the hook 22 of the rigging basket assembly 10, bends it over the beam 32, and attaches the hook 22 to the master link 20, thus creating a loop around the beam 32 to support the hoists' chain 30 and load (not shown), which is known in the industry as creating a basket 34.

The apparatus and methods discussed above affords several benefits over conventional apparatus and methods for making rigging baskets. These benefits include (1) a reduction in installation time, which saves money; (2) a huge reduction in accidents due to dropped hardware; (3) less stress on riggers; (4) the opportunity to create a dead hang more easily; (5) less chance of fouling a chain hook; (6) eliminates the need for additional padding on every point; (7) less employee hand fatigue from repetitive small motor activities; and (8) potentially less worker's compensation cases from issues like carpal tunnel syndrome or the like.

While the above description discusses the basket assembly 10 being used for rigging. However, the assembly of the present invention can be adapted to other areas of entertainment, such as permanent installs at theme parks, permanent house points in an arenas or anywhere conventional basket rigging would take place.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for creating a basket comprising:
   attaching a hoist's chain to a master link of a rigging assembly, the rigging assembly including a cable, a first loop formed on a first end of the cable, a second loop formed on a second end of the cable, the master link extending through the first loop, and a hook extending through the second loop;
   lifting the rigging assembly and attached hoist's chain to a beam;
   wrapping the hook of the rigging assembly around the beam; and
   attaching the hook to the master link.

2. The method of claim 1, further comprising forming the first and second loops by wrapping the first and second ends of the cable about an eye and securing the first and second ends of the cable to the cable with a thimble.

3. The method of claim 1, further comprising covering the cable, between the first and second ends, with a cable covering.

4. The method of claim 3, wherein the cable covering is a color-coded translucent cable covering.

5. The method of claim 4, further comprising determining a length of the cable by identifying a color of the color-coded translucent cable covering.

6. The method of claim 1, wherein the cable is a wire rope.

7. The method of claim 1, wherein the hook includes a swivel connector extending through the second loop of the cable and the hook is configured to swivel relative to the swivel connector.

8. The method of claim 7, wherein the hook is a self-locking hook extending from the swivel connector.

9. The method of claim 1, wherein the master link has an oblong shape.

* * * * *